US010025486B2

(12) United States Patent
Fein et al.

(10) Patent No.: US 10,025,486 B2
(45) Date of Patent: Jul. 17, 2018

(54) CROSS-REALITY SELECT, DRAG, AND DROP FOR AUGMENTED REALITY SYSTEMS

(71) Applicant: Elwha LLC, Bellevue, WA (US)

(72) Inventors: Gene Fein, Westlake, CA (US); Royce A. Levien, Lexington, MA (US); Richard T. Lord, Tacoma, WA (US); Robert W. Lord, Seattle, WA (US); Mark A. Malamud, Seattle, WA (US); John D. Rinaldo, Jr., Bellevue, WA (US); Clarence T. Tegreene, Mercer Island, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 13/840,712

(22) Filed: Mar. 15, 2013

(65) Prior Publication Data

US 2014/0282162 A1    Sep. 18, 2014

(51) Int. Cl.
*G06F 3/01* (2006.01)
*G06F 3/0484* (2013.01)
(Continued)

(52) U.S. Cl.
CPC ............ *G06F 3/0486* (2013.01); *G06F 3/011* (2013.01); *G06F 3/013* (2013.01); *G06F 3/017* (2013.01); *G06Q 30/0643* (2013.01)

(58) Field of Classification Search
None
See application file for complete search history.

(56) References Cited

U.S. PATENT DOCUMENTS 6,091,378 A    7/2000  Richardson et al.
6,625,299 B1   9/2003  Meisner et al.
(Continued)

FOREIGN PATENT DOCUMENTS

CN    102436663 A    5/2012
EP    1117074 A2    7/2001
(Continued)

OTHER PUBLICATIONS

PCT International Search Report; International App. No. PCT/US2014/025579; dated Jul. 29, 2014; pp. 1-4.
(Continued)

*Primary Examiner* — Jeffrey A Gaffin
*Assistant Examiner* — Nhat Huy T Nguyen

(57) ABSTRACT

Methods, apparatuses, computer program products, devices and systems are described that carry out detecting a first action of a user at a location in a real world field of view of an augmented reality device; displaying an augmented reality representation in response to at least one of a user input or detecting a first action of a user at a location in a real world field of view of an augmented reality device; moving the displayed augmented reality representation on a display of the augmented reality device according to at least one detected second action of the user; and registering the displayed augmented reality representation at a location in the display of the augmented reality device in response to at least one of a user input or moving a displayed augmented reality representation on a display of the augmented reality device according to at least one detected second action of the user.

26 Claims, 14 Drawing Sheets

Augmented reality device (smartphone showing a bookshelf in the camera's field of view)

The system detects a hand or finger gesture pointing to a book on a real bookshelf

(51) Int. Cl.
  *G02B 27/01* (2006.01)
  *G06F 3/0486* (2013.01)
  *G06Q 30/06* (2012.01)

(56) References Cited

U.S. PATENT DOCUMENTS

| | | | |
|---|---|---|---|
| 7,375,701 B2 | 5/2008 | Covannon et al. | |
| 7,801,328 B2 | 9/2010 | Au et al. | |
| 8,204,073 B1* | 6/2012 | Gailloux et al. | 370/437 |
| 8,544,033 B1 | 9/2013 | Acharya | |
| 8,633,070 B2 | 1/2014 | Mercay et al. | |
| 8,751,948 B2 | 6/2014 | Wetzer et al. | |
| 8,756,519 B2* | 6/2014 | Hunt | G06F 17/30861 715/760 |
| 2001/0044858 A1* | 11/2001 | Rekimoto | G06F 3/0317 710/1 |
| 2002/0044152 A1 | 4/2002 | Abbott, III et al. | |
| 2002/0163521 A1 | 11/2002 | Ellenby et al. | |
| 2002/0167522 A1 | 11/2002 | Miyazawa | |
| 2003/0037068 A1 | 2/2003 | Thomas et al. | |
| 2003/0210832 A1 | 11/2003 | Benton | |
| 2004/0046711 A1 | 3/2004 | Triebfuerst | |
| 2004/0113885 A1 | 6/2004 | Genc et al. | |
| 2005/0206583 A1 | 9/2005 | Lemelson et al. | |
| 2006/0181484 A1 | 8/2006 | Sprague et al. | |
| 2006/0227862 A1 | 10/2006 | Campbell et al. | |
| 2006/0262140 A1 | 11/2006 | Kujawa et al. | |
| 2007/0162942 A1 | 7/2007 | Hamynen et al. | |
| 2007/0265082 A1 | 11/2007 | Shimura et al. | |
| 2007/0279521 A1 | 12/2007 | Cohen | |
| 2008/0071559 A1 | 3/2008 | Arrasvuori | |
| 2008/0253737 A1 | 10/2008 | Kimura et al. | |
| 2008/0266323 A1 | 10/2008 | Biocca et al. | |
| 2008/0270947 A1 | 10/2008 | Elber et al. | |
| 2009/0013052 A1 | 1/2009 | Robarts et al. | |
| 2009/0049004 A1 | 2/2009 | Nurminen et al. | |
| 2009/0167787 A1* | 7/2009 | Bathiche | A63F 13/10 345/633 |
| 2009/0182499 A1 | 7/2009 | Bravo | |
| 2009/0237328 A1 | 9/2009 | Gyorfi et al. | |
| 2009/0262206 A1 | 10/2009 | Park | |
| 2009/0300535 A1 | 12/2009 | Skourup et al. | |
| 2010/0161409 A1 | 6/2010 | Ryu et al. | |
| 2010/0164990 A1 | 7/2010 | Van Doorn | |
| 2010/0208033 A1* | 8/2010 | Edge et al. | 348/46 |
| 2010/0226535 A1 | 9/2010 | Kimchi et al. | |
| 2010/0238161 A1 | 9/2010 | Varga et al. | |
| 2010/0253764 A1 | 10/2010 | Sim et al. | |
| 2010/0295921 A1 | 11/2010 | Guthrie et al. | |
| 2010/0328344 A1 | 12/2010 | Mattila et al. | |
| 2010/0332315 A1 | 12/2010 | Kamar et al. | |
| 2011/0074658 A1 | 3/2011 | Sato | |
| 2011/0075257 A1 | 3/2011 | Hua et al. | |
| 2011/0082755 A1 | 4/2011 | Itzhak | |
| 2011/0138317 A1* | 6/2011 | Kang | G06F 3/011 715/780 |
| 2011/0141254 A1 | 6/2011 | Roebke et al. | |
| 2011/0164163 A1 | 7/2011 | Bilbrey et al. | |
| 2011/0202878 A1 | 8/2011 | Park et al. | |
| 2011/0209201 A1 | 8/2011 | Chollat | |
| 2011/0214082 A1 | 9/2011 | Osterhout et al. | |
| 2011/0227820 A1 | 9/2011 | Haddick et al. | |
| 2011/0231781 A1 | 9/2011 | Betzler et al. | |
| 2011/0238751 A1 | 9/2011 | Belimpasakis et al. | |
| 2011/0242134 A1 | 10/2011 | Miller et al. | |
| 2011/0258049 A1 | 10/2011 | Ramer et al. | |
| 2012/0025975 A1 | 2/2012 | Richey et al. | |
| 2012/0038669 A1 | 2/2012 | Lee et al. | |
| 2012/0062596 A1 | 3/2012 | Bedi et al. | |
| 2012/0099800 A1 | 4/2012 | Llano et al. | |
| 2012/0102439 A1 | 4/2012 | Mitchell et al. | |
| 2012/0105473 A1 | 5/2012 | Bar-Zeev et al. | |
| 2012/0105475 A1 | 5/2012 | Tseng | |
| 2012/0113092 A1 | 5/2012 | Bar-Zeev et al. | |
| 2012/0113140 A1 | 5/2012 | Hilliges et al. | |
| 2012/0120113 A1 | 5/2012 | Hueso | |
| 2012/0147328 A1 | 6/2012 | Yahav | |
| 2012/0166435 A1 | 6/2012 | Graham et al. | |
| 2012/0176410 A1 | 7/2012 | Meier et al. | |
| 2012/0198339 A1 | 8/2012 | Williams et al. | |
| 2012/0206323 A1 | 8/2012 | Osterhout et al. | |
| 2012/0233033 A1 | 9/2012 | Calman et al. | |
| 2012/0243732 A1 | 9/2012 | Swaminathan et al. | |
| 2012/0246027 A1 | 9/2012 | Martin | |
| 2012/0249588 A1 | 10/2012 | Tison et al. | |
| 2012/0249591 A1 | 10/2012 | Maciocci et al. | |
| 2012/0249741 A1 | 10/2012 | Maciocci et al. | |
| 2012/0249797 A1 | 10/2012 | Haddick et al. | |
| 2012/0269494 A1 | 10/2012 | Satyanarayana et al. | |
| 2012/0299962 A1 | 11/2012 | White et al. | |
| 2012/0304111 A1 | 11/2012 | Queru | |
| 2012/0308209 A1 | 12/2012 | Zaletel | |
| 2012/0317484 A1 | 12/2012 | Gomez et al. | |
| 2012/0324494 A1 | 12/2012 | Burger | |
| 2013/0027572 A1 | 1/2013 | Petrou | |
| 2013/0032634 A1 | 2/2013 | McKirdy | |
| 2013/0044128 A1 | 2/2013 | Liu et al. | |
| 2013/0044129 A1 | 2/2013 | Latta et al. | |
| 2013/0050432 A1 | 2/2013 | Perez et al. | |
| 2013/0054622 A1 | 2/2013 | Karmarkar et al. | |
| 2013/0076788 A1 | 3/2013 | Ben Zvi | |
| 2013/0083003 A1 | 4/2013 | Perez et al. | |
| 2013/0083007 A1 | 4/2013 | Geisner et al. | |
| 2013/0083009 A1 | 4/2013 | Geisner et al. | |
| 2013/0085345 A1 | 4/2013 | Geisner et al. | |
| 2013/0093788 A1 | 4/2013 | Liu et al. | |
| 2013/0125027 A1* | 5/2013 | Abovitz | 715/757 |
| 2013/0128364 A1 | 5/2013 | Wheeler | |
| 2013/0141453 A1 | 6/2013 | Devara et al. | |
| 2013/0147836 A1 | 6/2013 | Small et al. | |
| 2013/0162632 A1 | 6/2013 | Varga et al. | |
| 2013/0170697 A1 | 7/2013 | Zises | |
| 2013/0188032 A1 | 7/2013 | Vertegaal | |
| 2013/0194164 A1* | 8/2013 | Sugden et al. | 345/8 |
| 2013/0218721 A1* | 8/2013 | Borhan et al. | 705/26.41 |
| 2013/0290233 A1 | 10/2013 | Ferren et al. | |
| 2013/0326583 A1* | 12/2013 | Freihold et al. | 726/3 |
| 2013/0335573 A1 | 12/2013 | Forutanpour et al. | |
| 2013/0342571 A1 | 12/2013 | Kinnebrew et al. | |
| 2014/0002357 A1 | 1/2014 | Pombo et al. | |
| 2014/0063055 A1 | 3/2014 | Osterhout et al. | |
| 2014/0092130 A1 | 4/2014 | Anderson et al. | |
| 2014/0100997 A1 | 4/2014 | Mayerle et al. | |
| 2014/0108309 A1 | 4/2014 | Frank et al. | |
| 2014/0129342 A1 | 5/2014 | Sanghavi et al. | |
| 2014/0225898 A1 | 8/2014 | Fyke et al. | |
| 2014/0237366 A1 | 8/2014 | Poulos et al. | |

FOREIGN PATENT DOCUMENTS

| | | |
|---|---|---|
| EP | 1 271 293 A2 | 1/2003 |
| EP | 2 418 563 A2 | 2/2012 |
| EP | 2 442 539 A1 | 4/2012 |
| KR | 10-2012-0066552 A | 6/2012 |
| WO | WO 2012/108721 A2 | 8/2012 |

OTHER PUBLICATIONS

Broll et al.; "An Infrastructure for Realizing Custom-Tailored Augmented Reality User Interfaces"; IEEE Transactions on Visualization and Computer Graphics; Nov./Dec. 2005; pp. 722-733; vol. 11, No. 6; IEEE Computer Society.

Irawati et al.; "VARU Framework: Enabling Rapid Prototyping of VR, AR and Ubiquitous Applications"; IEEE Virtual Reality Conference, Reno, NV; Mar. 8-12, 2008; pp. 201-208.

PCT International Search Report; International App. No. PCT/US2014/025639; dated Jul. 17, 2014; pp. 1-4.

PCT International Search Report; International App. No. PCT/US2014/025604; dated Jul. 11, 2014; pp. 1-3.

PCT International Search Report; International App. No. PCT/US2014/025669; dated Jul. 9, 2014; pp. 1-3.

(56) References Cited

OTHER PUBLICATIONS

Correia et al.; "HyperMem: A System to Store and Replay Experiences in Mixed Reality Worlds"; Proceedings of the 2005 International Conference on Cyberworlds (CW' 05); bearing a date of 2005; created on Oct. 25, 2016; 8 pages; IEEE.
Butz, et al.; "Enveloping Users and Computers in a Collaborative 3D Augmented Reality"; bearing a date of Oct. 20-21, 1999; pp. 35-44; Augmented Reality IEEE.
European Patent Office, Extended European Search Report, Pursuant to Rule 62 EPC; App. No. EP 14 76 7447; dated Sep. 21, 2016 (received by our agent on Oct. 6, 2016); pp. 1-7.
European Patent Office, Extended European Search Report, Pursuant to Rule 62 EPC; App. No. EP 14 76 9243.8; dated Oct. 12, 2016 (received by our agent on Oct. 17, 2016); pp. 1-10.
European Patent Office, Extended European Search Report, Pursuant to Rule 62 EPC; App. No. EP 14 77 0781.4; Oct. 12, 2016 (received by our agent on Oct. 13, 2016); pp. 1-10.
European Patent Office, Extended European Search Report, Pursuant to Rule 62 EPC; App. No. EP 14 77 0115.5; dated Oct. 12, 2016 (received by our agent on Oct. 13, 2016); pp. 1-10.
Rekimoto, et al.; "Augment-able Reality: Situated Communication through Physical and Digital Spaces"; bearing a date of Oct. 19-20, 1998; pp. 68-75; Wearable Computers.
Rekimoto, et al.; "CyberCode: Designing Augmented Reality Environments with Visual Tags"; bearing a date of Apr. 1, 2000; pp. 1-10; ACM.
Takacs, Gabriel et al.; "Outdoors Augmented Reality on Mobile Phone using Loxel-Based Visual Feature Organization"; Multimedia Information Retrieval 2008; bearing a date of Oct. 30-31, 2008; pp. 427-434; ACM.
European Patent Office, Supplementary European Search Report, Pursuant to Rule 62 EPC; App. No. EP 14751531.6; dated Sep. 9, 2016 (received by our Agent on Sep. 9, 2016); pp. 1-11.
Bonsor, Kevin; "How Augmented Reality Works"; bearing a date of Dec. 20, 2010; located at: http://computer.howstuffworks.com/augmented-reality.htm; pp. 1-3.
Chinese State Intellectual Property Office, First Office Action, App. No. 201480028245.3 (Based on PCT Patent Application No. PCT/2014/025579); dated Feb. 14, 2018; (machine translation provided herewith, 13 pages total).

\* cited by examiner

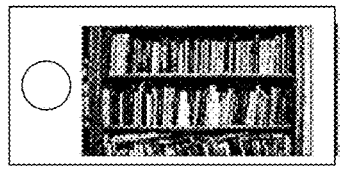

FIG. 4a: Augmented reality device (smartphone showing a bookshelf in the camera's field of view)

FIG. 4b: The system detects a hand or finger gesture pointing to a book on a real bookshelf

FIG. 4c: An augmented reality representation of the book is created and shown by the system on the augmented reality device

FIG. 4d: Based on a detected gesture of the user, the system "drags" the augmented reality representation of the book to a destination

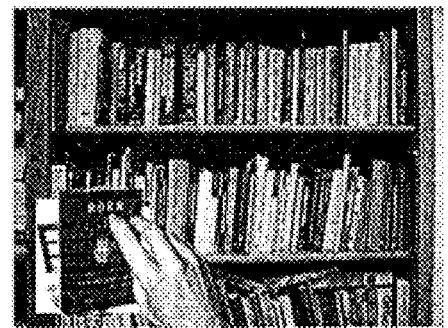

FIG. 4e: The system registers the dragged object at the destination; the "drop"

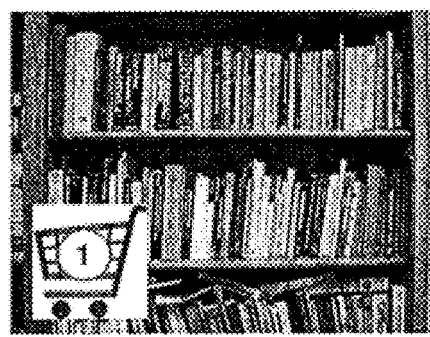

FIG. 4f: Optional: the augmented reality display shows that the object has been dropped at the destination

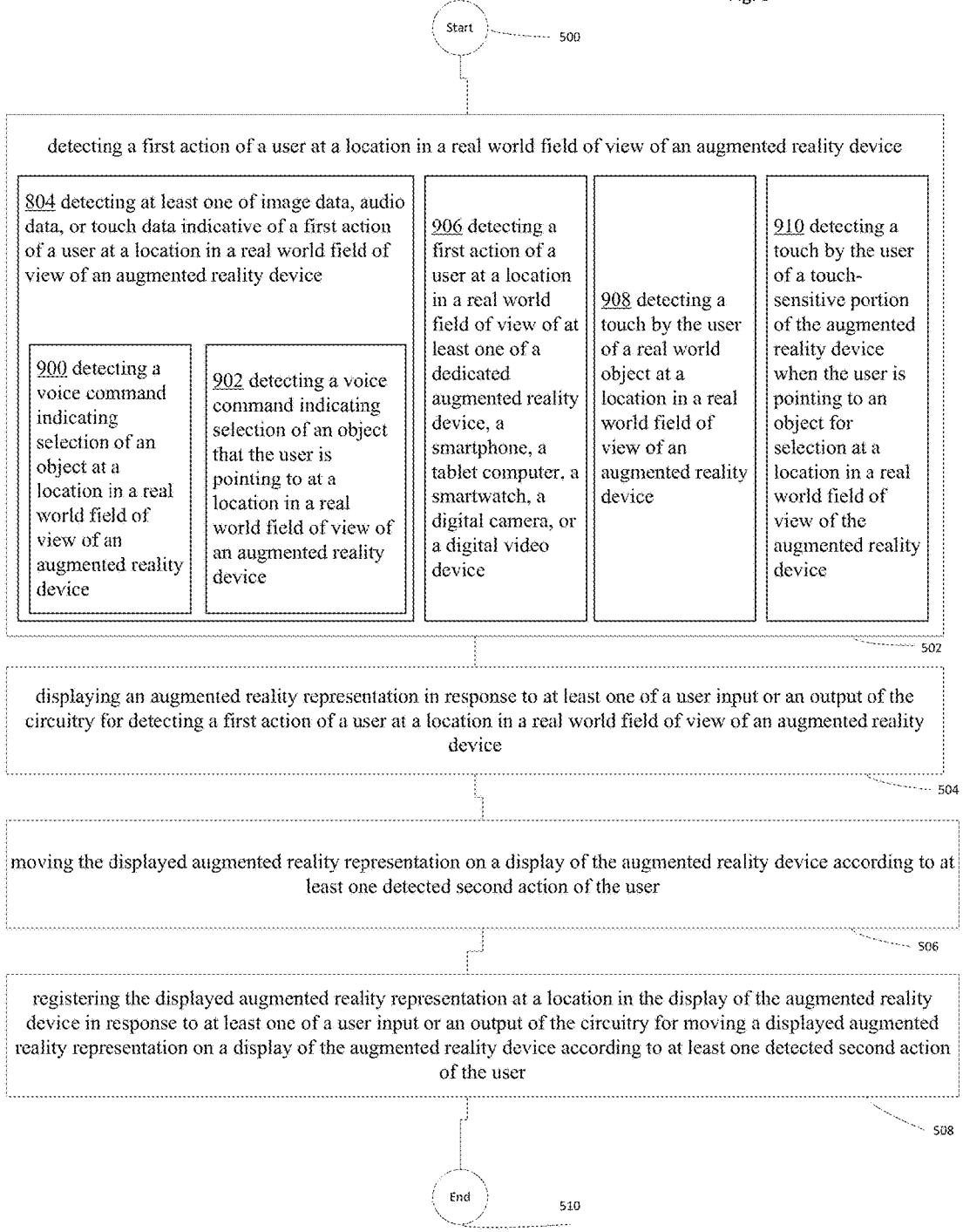

Fig. 10

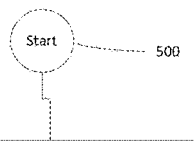
Start — 500 detecting a first action of a user at a location in a real world field of view of an augmented reality device — 502 displaying an augmented reality representation in response to at least one of a user input or an output of the circuitry for detecting a first action of a user at a location in a real world field of view of an augmented reality device

| 1000 displaying at least one of a photo, a computer generated image, or a cartoon in response to at least one of a user input or an output of the circuitry for detecting a first action of a user at a location in a real world field of view of an augmented reality device | 1002 displaying an augmented reality representation in response to at least one of a user gesture input, a user voice input, or a user touch input | 1004 displaying an augmented reality representation in response to an output of the circuitry for detecting a first action of a user at a location in a real world field of view of an augmented reality device, wherein the output of the circuitry for detecting a first action of a user at a location in a real world field of view of an augmented reality device matches at least one of a stored gesture, a stored image, or a stored voice command |

— 504 moving the displayed augmented reality representation on a display of the augmented reality device according to at least one detected second action of the user — 506 registering the displayed augmented reality representation at a location in the display of the augmented reality device in response to at least one of a user input or an output of the circuitry for moving a displayed augmented reality representation on a display of the augmented reality device according to at least one detected second action of the user — 508

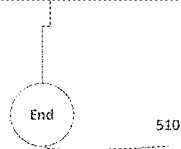
End — 510

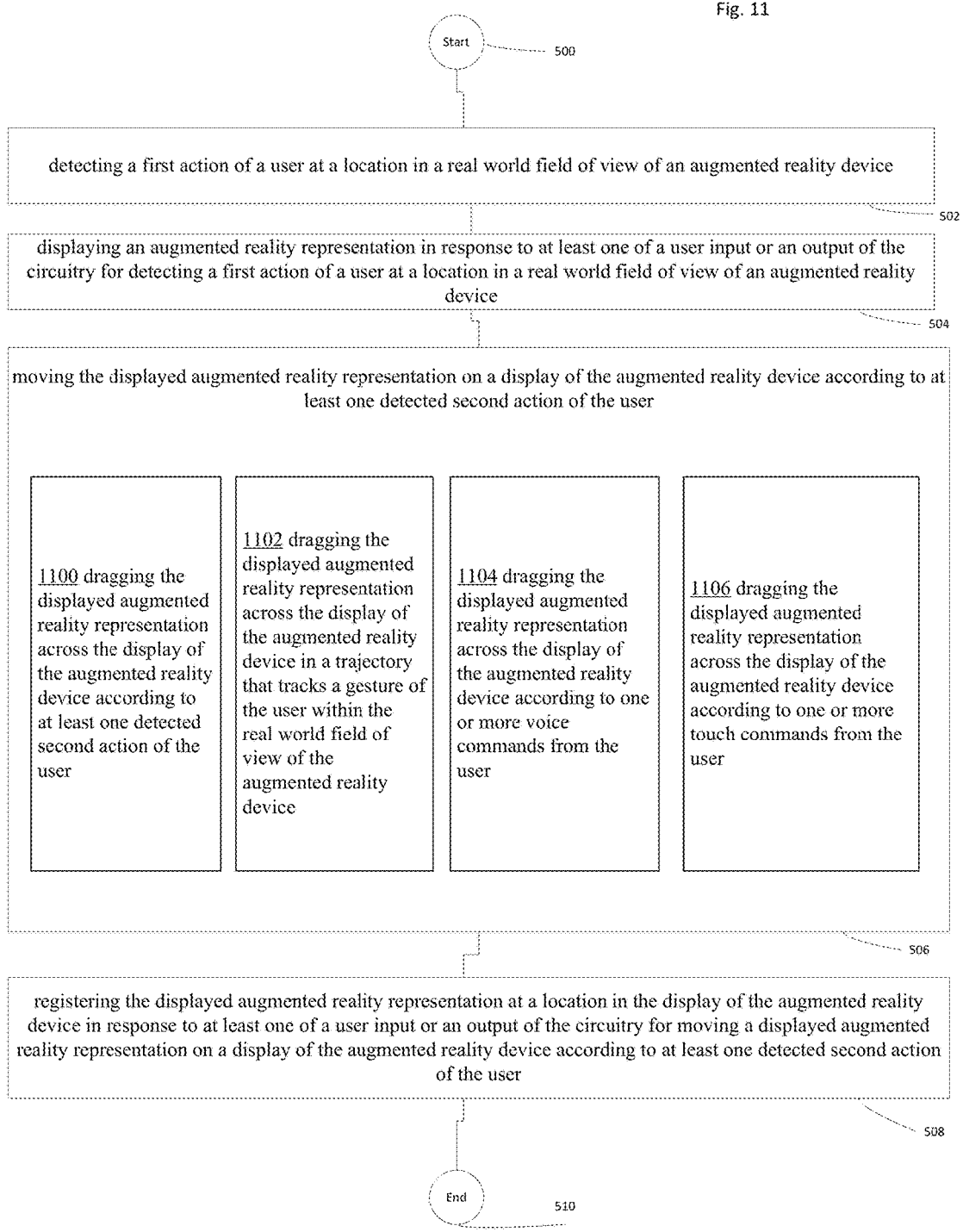

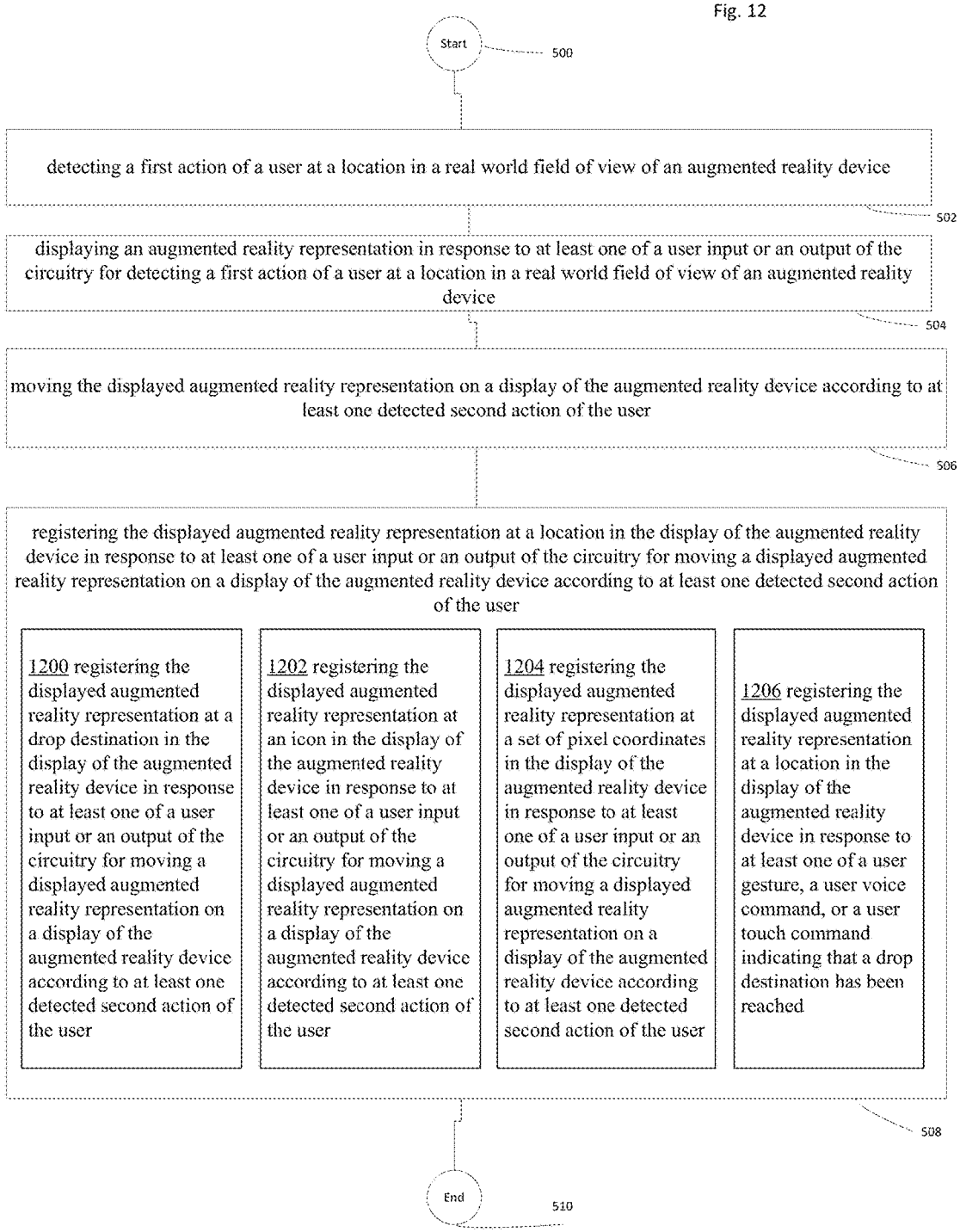

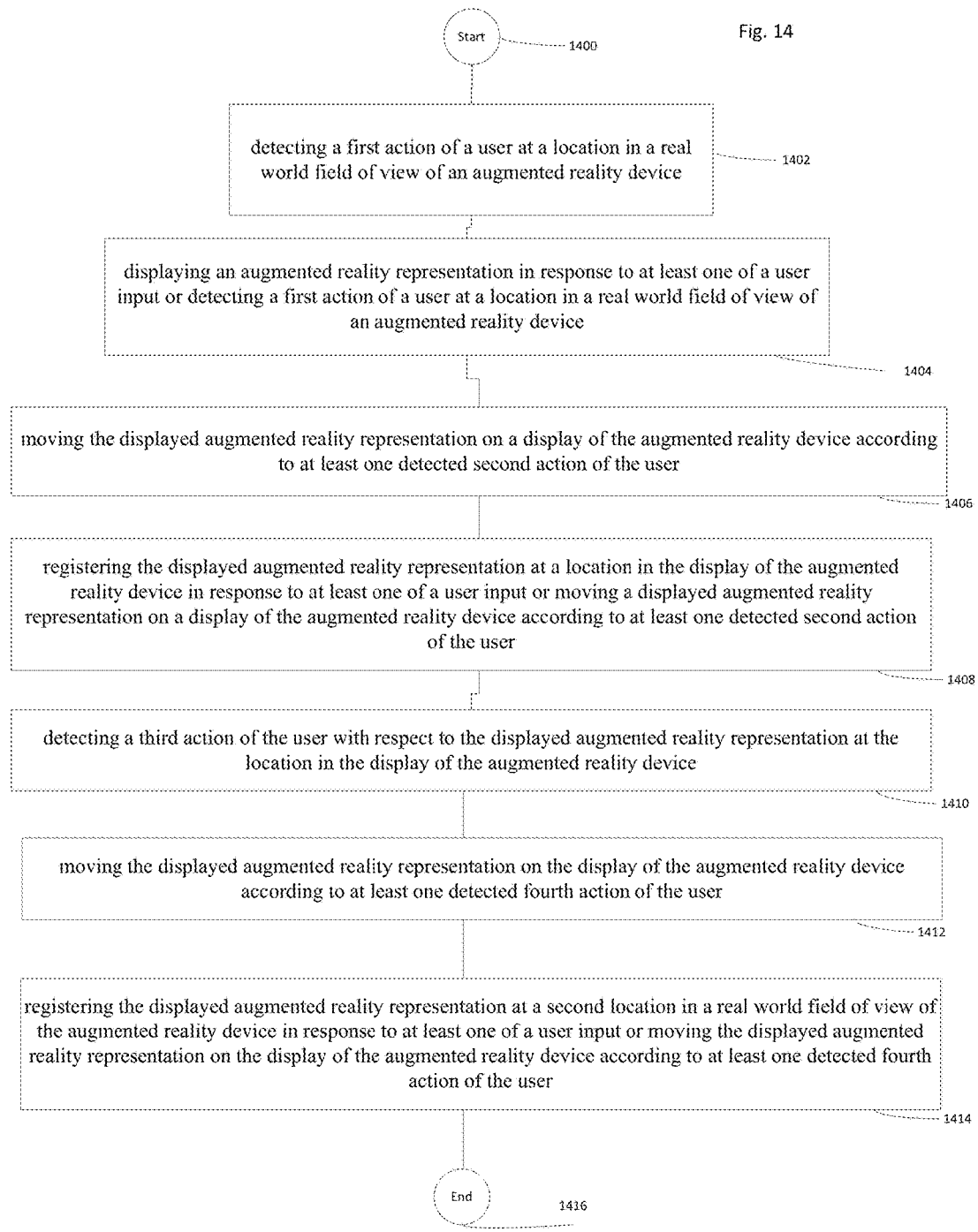

CROSS-REALITY SELECT, DRAG, AND DROP FOR AUGMENTED REALITY SYSTEMS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, greatgrandparent, etc. applications of the Priority Application(s)). In addition, the present application is related to the "Related Applications," if any, listed below.

PRIORITY APPLICATIONS

None

RELATED APPLICATIONS

U.S. patent application Ser. No. 13/646,147, entitled FORMATTING OF ONE OR MORE PERSISTENT AUGMENTATIONS IN AN AUGMENTED VIEW IN RESPONSE TO MULTIPLE INPUT FACTORS, naming Gene Fein, Royce A. Levien, Richard T. Lord, Robert W. Lord, Mark A. Malamud, John D. Rinaldo, Jr., and Clarence T. Tegreene as inventors, filed 5 Oct. 2012, is related to the present application.

U.S. patent application Ser. No. 13/648,012, entitled FORMATTING OF ONE OR MORE PERSISTENT AUGMENTATIONS IN AN AUGMENTED VIEW IN RESPONSE TO MULTIPLE INPUT FACTORS, naming Gene Fein, Royce A. Levien, Richard T. Lord, Robert W. Lord, Mark A. Malamud, John D. Rinaldo, Jr., and Clarence T. Tegreene as inventors, filed 9 Oct. 2012, is related to the present application.

U.S. patent application Ser. No. 13/672,575, entitled PRESENTING AN AUGMENTED VIEW IN RESPONSE TO ACQUISITION OF DATA INFERRING USER ACTIVITY, naming Gene Fein, Royce A. Levien, Richard T. Lord, Robert W. Lord, Mark A. Malamud, John D. Rinaldo, Jr., and Clarence T. Tegreene as inventors, filed 9 Nov. 2012, is related to the present application.

U.S. patent application Ser. No. 13/673,070, entitled PRESENTING AN AUGMENTED VIEW IN RESPONSE TO ACQUISITION OF DATA INFERRING USER ACTIVITY, naming Gene Fein, Royce A. Levien, Richard T. Lord, Robert W. Lord, Mark A. Malamud, John D. Rinaldo, Jr., and Clarence T. Tegreene as inventors, filed 9 Nov. 2012, is related to the present application.

U.S. patent application Ser. No. 13/689,372, entitled SYSTEMS AND METHODS FOR SHARING AUGMENTATION DATA, naming Gene Fein, Royce A. Levien, Richard T. Lord, Robert W. Lord, Mark A. Malamud, John D. Rinaldo, Jr., and Clarence T. Tegreene as inventors, filed 29 Nov. 2012, is related to the present application.

U.S. patent application Ser. No. 13/690,003, entitled SYSTEMS AND METHODS FOR SHARING AUGMENTATION DATA, naming Gene Fein, Royce A. Levien, Richard T. Lord, Robert W. Lord, Mark A. Malamud, John D. Rinaldo, Jr., and Clarence T. Tegreene as inventors, filed 30 Nov. 2012, is related to the present application.

U.S. patent application Ser. No. 13/709,465, entitled SYSTEMS AND METHODS FOR OBTAINING AND USING AUGMENTATION DATA AND FOR SHARING USAGE DATA, naming Gene Fein, Royce A. Levien, Richard T. Lord, Robert W. Lord, Mark A. Malamud, John D. Rinaldo, Jr., and Clarence T. Tegreene as inventors, filed 10 Dec. 2012, is related to the present application.

U.S. patent application Ser. No. 13/711,095, entitled SYSTEMS AND METHODS FOR OBTAINING AND USING AUGMENTATION DATA AND FOR SHARING USAGE DATA, naming Gene Fein, Royce A. Levien, Richard T. Lord, Robert W. Lord, Mark A. Malamud, John D. Rinaldo, Jr., and Clarence T. Tegreene as inventors, filed 11 Dec. 2012, is related to the present application.

U.S. patent application Ser. No. 13/721,340, entitled CORRELATING USER REACTION WITH AT LEAST AN ASPECT ASSOCIATED WITH AN AUGMENTATION OF AN AUGMENTED VIEW, naming Gene Fein, Royce A. Levien, Richard T. Lord, Robert W. Lord, Mark A. Malamud, John D. Rinaldo, Jr., and Clarence T. Tegreene as inventors, filed 20 Dec. 2012, is related to the present application.

U.S. patent application Ser. No. 13/723,610, entitled CORRELATING USER REACTION WITH AT LEAST AN ASPECT ASSOCIATED WITH AN AUGMENTATION OF AN AUGMENTED VIEW, naming Gene Fein, Royce A. Levien, Richard T. Lord, Robert W. Lord, Mark A. Malamud, John D. Rinaldo, Jr., and Clarence T. Tegreene as inventors, filed 21 Dec. 2012, is related to the present application.

U.S. patent application Ser. No. 13/729,278, entitled CORRELATING USER REACTIONS WITH AUGMENTATIONS DISPLAYED THROUGH AUGMENTED VIEWS, naming Gene Fein, Royce A. Levien, Richard T. Lord, Robert W. Lord, Mark A. Malamud, John D. Rinaldo, Jr., and Clarence T. Tegreene as inventors, filed 28 Dec. 2012, is related to the present application.

U.S. patent application Ser. No. 13/731,233, entitled CORRELATING USER REACTIONS WITH AUGMENTATIONS DISPLAYED THROUGH AUGMENTED VIEWS, naming Gene Fein, Royce A. Levien, Richard T. Lord, Robert W. Lord, Mark A. Malamud, John D. Rinaldo, Jr., and Clarence T. Tegreene as inventors, filed 31 Dec. 2012, is related to the present application.

U.S. patent application Ser. No. 13/768,048, entitled DISPLAYING IN RESPONSE TO DETECTING ONE OR MORE USER BEHAVIORS ONE OR MORE SECOND AUGMENTATIONS THAT ARE BASED ON ONE OR MORE REGISTERED FIRST AUGMENTATIONS, naming Gene Fein, Royce A. Levien, Richard T. Lord, Robert W. Lord, Mark A. Malamud, John D. Rinaldo, Jr., and Clarence T. Tegreene as inventors, filed 15 Feb. 2013, is related to the present application.

U.S. patent application Ser. No. 13/770,053, entitled DISPLAYING IN RESPONSE TO DETECTING ONE OR MORE USER BEHAVIORS ONE OR MORE SECOND AUGMENTATIONS THAT ARE BASED ON ONE OR MORE REGISTERED FIRST AUGMENTATIONS, naming Gene Fein, Royce A. Levien, Richard T. Lord, Robert W. Lord, Mark A. Malamud, John D. Rinaldo, Jr., and Clarence T. Tegreene as inventors, filed 19 Feb. 2013, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official 5 Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This description relates to data capture, data handling, and data display techniques.

SUMMARY

An embodiment provides a system. In one implementation, the system includes but is not limited to circuitry for detecting a first action of a user at a location in a real world field of view of an augmented reality device; circuitry for displaying an augmented reality representation in response to at least one of a user input or an output of the circuitry for detecting a first action of a user at a location in a real world field of view of an augmented reality device; circuitry for moving the displayed augmented reality representation on a display of the augmented reality device according to at least one detected second action of the user; and circuitry for registering the displayed augmented reality representation at a location in the display of the augmented reality device in response to at least one of a user input or an output of the circuitry for moving a displayed augmented reality representation on a display of the augmented reality device according to at least one detected second action of the user. In addition to the foregoing, other system aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one or more various aspects, related systems include but are not limited to computing means and/or programming for effecting the herein-referenced method aspects; the computing means and/or programming may be virtually any combination of hardware, software, and/or firmware configured to effect the herein-referenced method aspects depending upon the design choices of the system designer.

An embodiment provides a computer-implemented method. In one implementation, the method includes but is not limited to detecting a first action of a user at a location in a real world field of view of an augmented reality device; displaying an augmented reality representation in response to at least one of a user input or detecting a first action of a user at a location in a real world field of view of an augmented reality device; moving the displayed augmented reality representation on a display of the augmented reality device according to at least one detected second action of the user; and registering the displayed augmented reality representation at a location in the display of the augmented reality device in response to at least one of a user input or moving a displayed augmented reality representation on a display of the augmented reality device according to at least one detected second action of the user. In addition to the foregoing, other method aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to detecting a first action of a user at a location in a real world field of view of an augmented reality device; displaying an augmented reality representation in response to at least one of a user input or detecting a first action of a user at a location in a real world field of view of an augmented reality device; moving the displayed augmented reality representation on a display of the augmented reality device according to at least one detected second action of the user; and registering the displayed augmented reality representation at a location in the display of the augmented reality device in response to at least one of a user input or moving a displayed augmented reality representation on a display of the augmented reality device according to at least one detected second action of the user. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to detect a first action of a user at a location in a real world field of view of an augmented reality device; display an augmented reality representation in response to at least one of a user input or detecting a first action of a user at a location in a real world field of view of an augmented reality device; move the displayed augmented reality representation on a display of the augmented reality device according to at least one detected second action of the user; and register the displayed augmented reality representation at a location in the display of the augmented reality device in response to at least one of a user input or moving a displayed augmented reality representation on a display of the augmented reality device according to at least one detected second action of the user. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

With reference now to FIG. 1, shown is a number of examples of augmented reality devices.

FIG. 4 illustrates an example of a system for selecting, dragging, and dropping in augmented reality systems in which embodiments may be implemented, perhaps in a device and/or through a network, which may serve as a context for introducing one or more processes and/or devices described herein.

Figure 5:
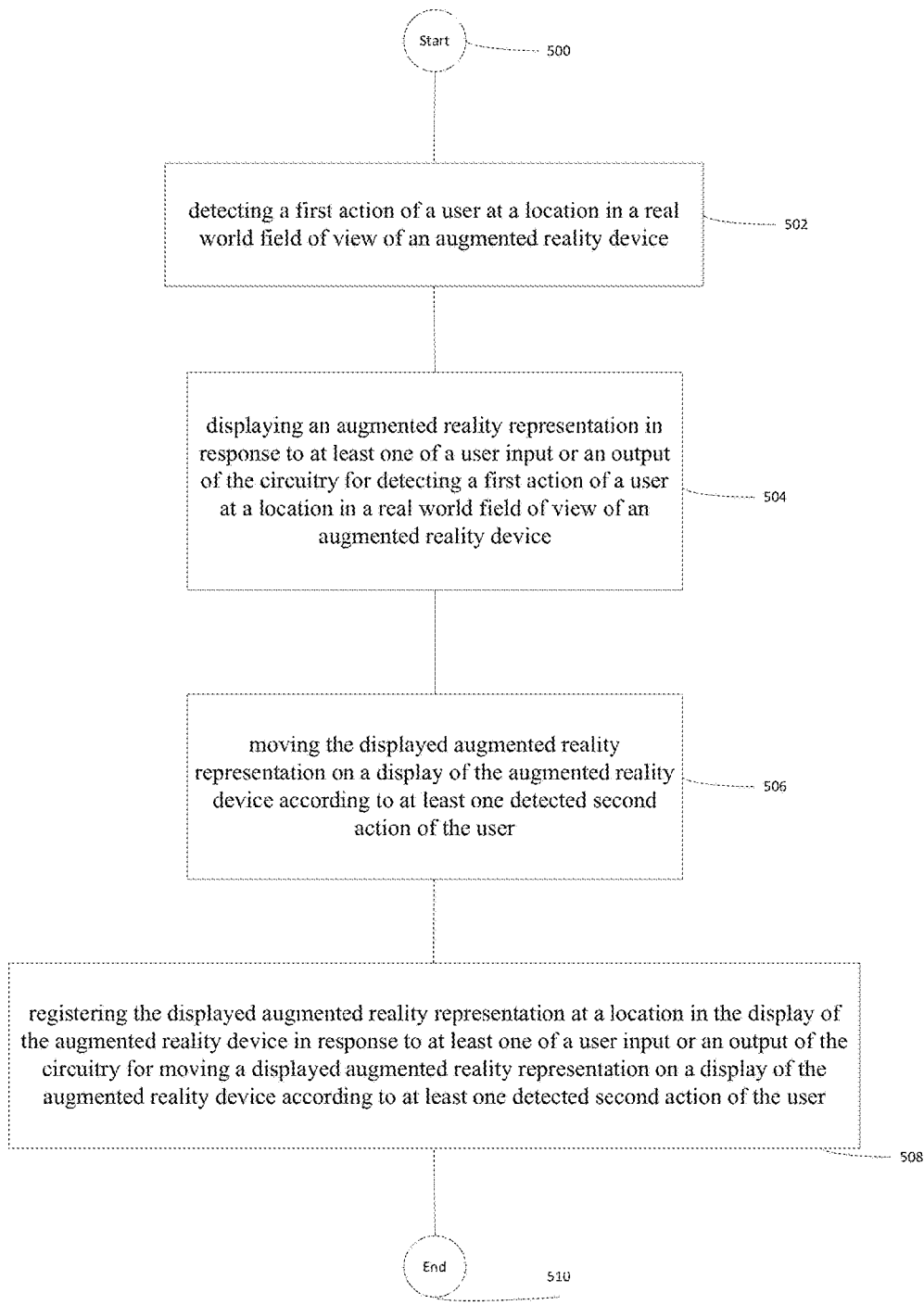

With reference now to FIG. 5, shown is an example of an operational flow representing example operations related to selecting, dragging, and dropping in augmented reality systems, which may serve as a context for introducing one or more processes and/or devices described herein.

Figure 6:
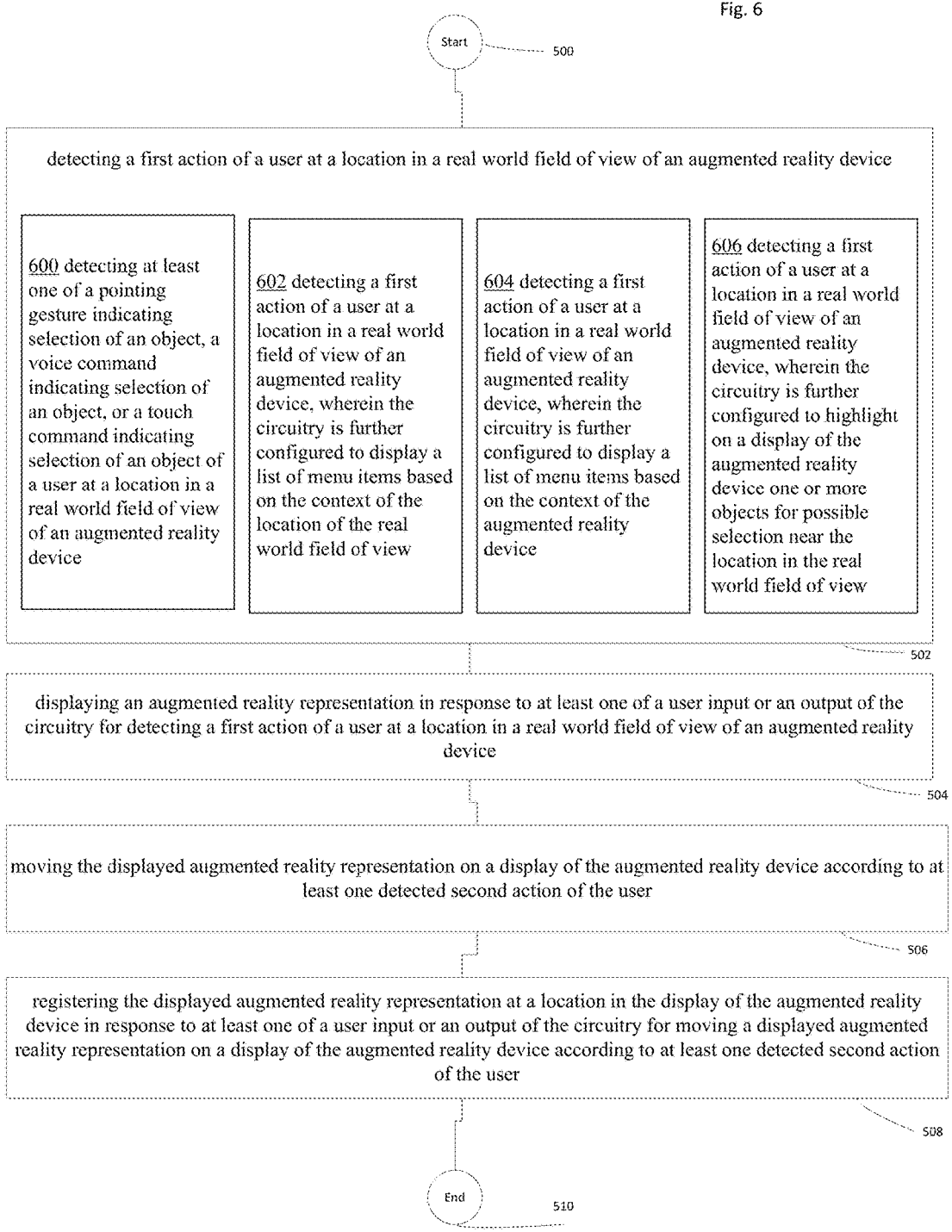

FIG. 6 illustrates an alternative embodiment of the example operational flow of FIG. 5.

Figure 7:
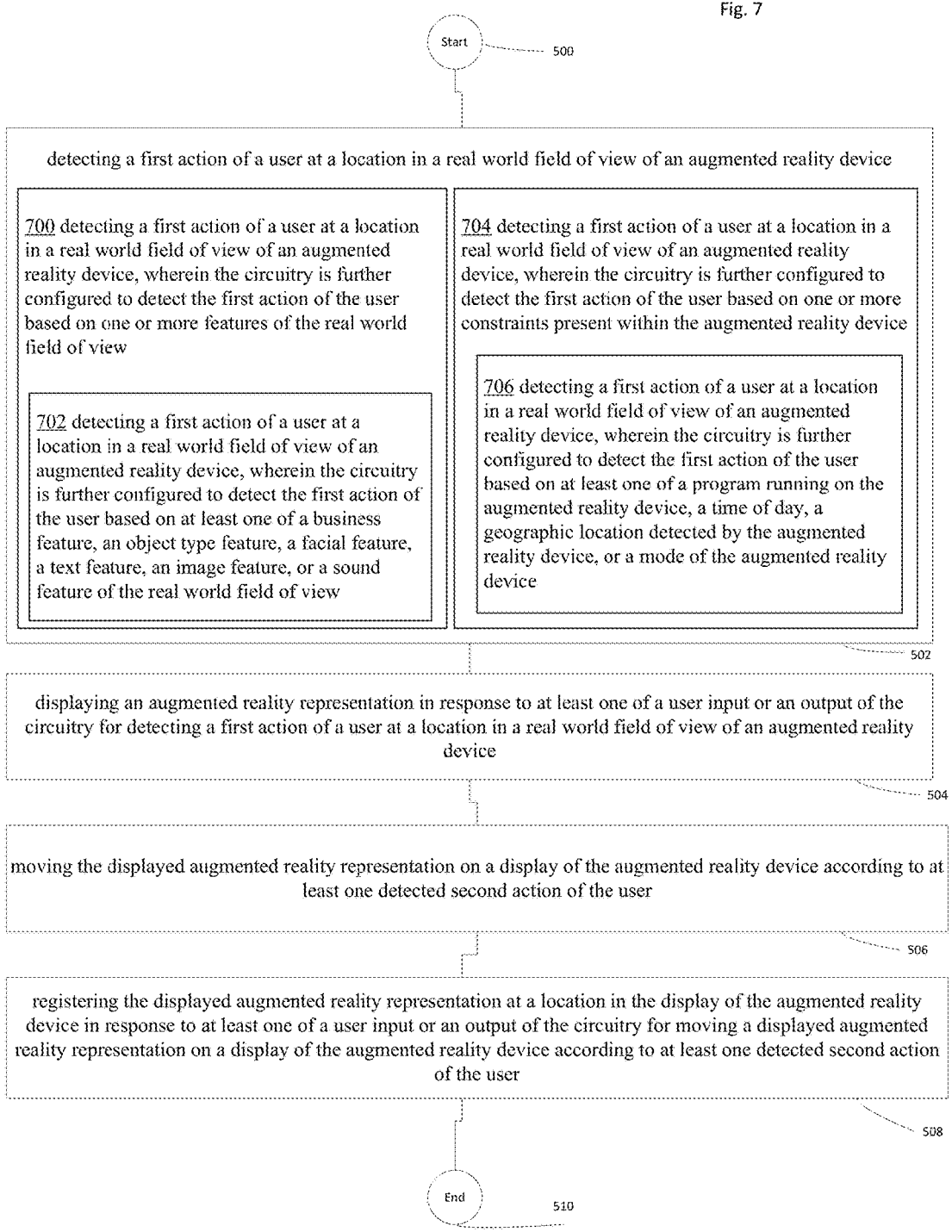

FIG. 7 illustrates an alternative embodiment of the example operational flow of FIG. 5.

Figure 8:
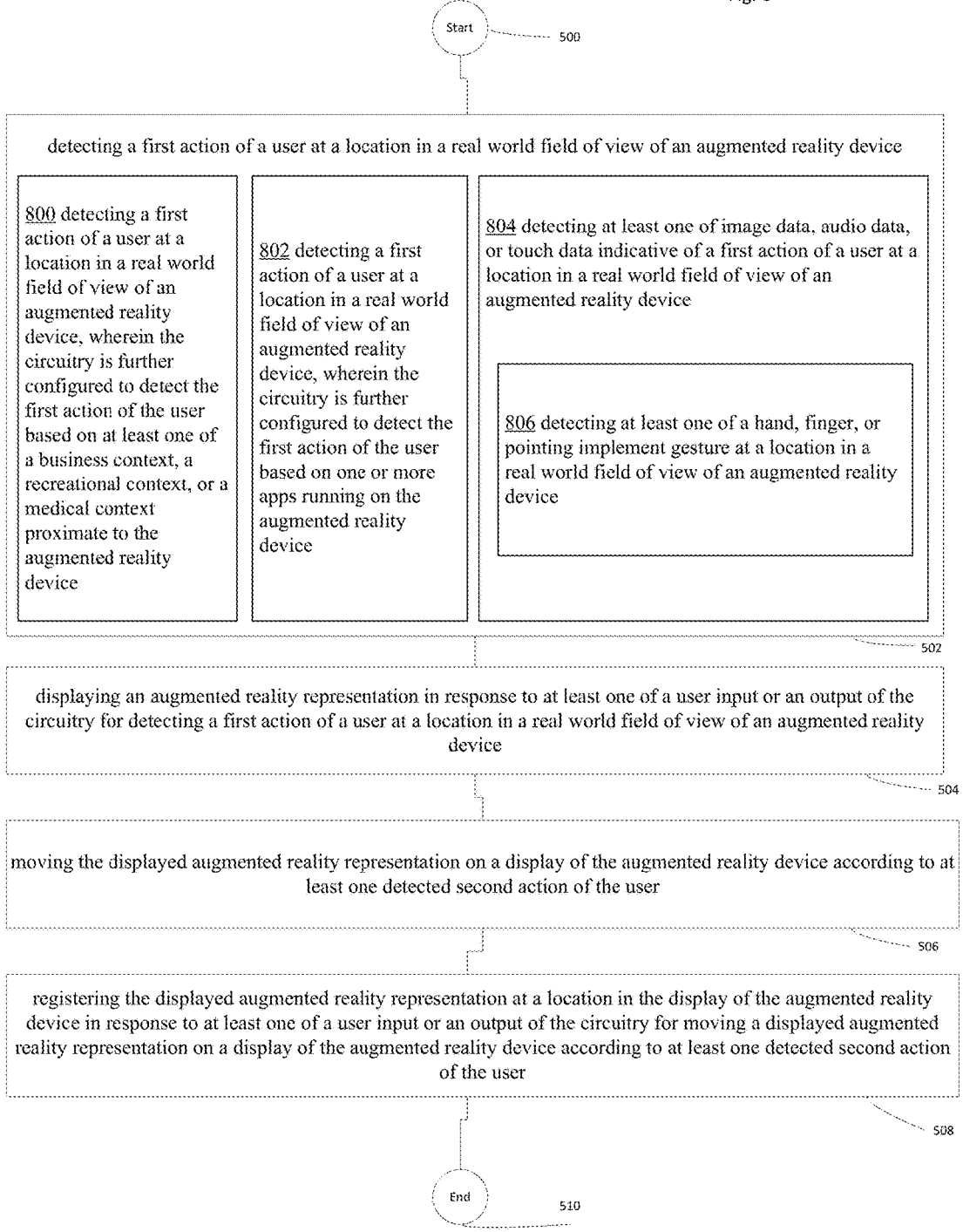

FIG. 8 illustrates an alternative embodiment of the example operational flow of FIG. 5.

FIG. 9 illustrates an alternative embodiment of the example operational flow of FIG. 5.

FIG. 10 illustrates an alternative embodiment of the example operational flow of FIG. 5.

FIG. 11 illustrates an alternative embodiment of the example operational flow of FIG. 5.

FIG. 12 illustrates an alternative embodiment of the example operational flow of FIG. 5.

Figure 13:
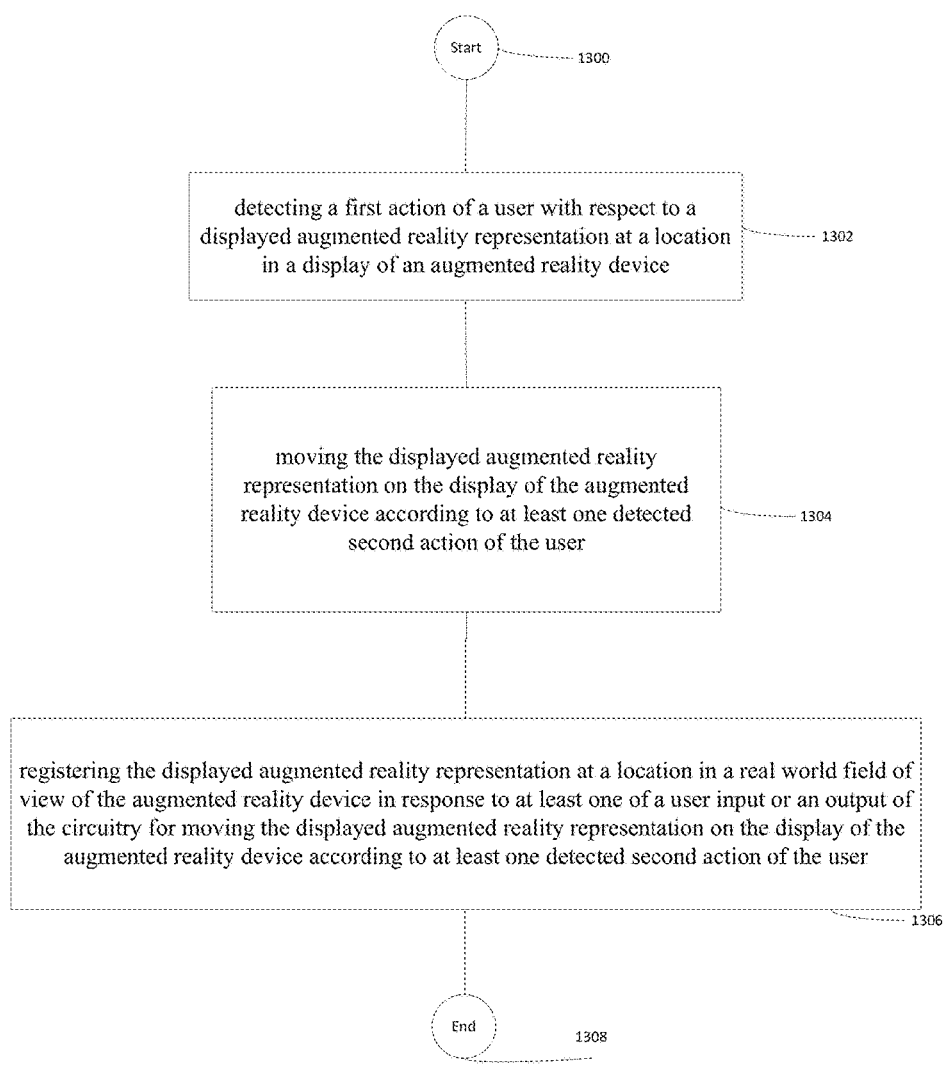

With reference now to FIG. 13, shown is an example of an operational flow representing example operations related to selecting, dragging, and dropping in augmented reality systems, which may serve as a context for introducing one or more processes and/or devices described herein.

With reference now to FIG. 14, shown is an example of an operational flow representing example operations related to selecting, dragging, and dropping in augmented reality systems, which may serve as a context for introducing one or more processes and/or devices described herein.

The use of the same symbols in different drawings typically indicates similar or identical items unless context dictates otherwise.

DETAILED DESCRIPTION

In a world where people interact through augmented reality devices, such dedicated augmented reality devices (e.g., Google Glass eyeglasses), smartphones, digital cameras, camcorders, and tablets, the augmented reality display or interface provides a window on the real world, onto which is layered one or more computer generated objects, digital images, or functions. Structurally and semantically, an augmented reality user interface is fundamentally responsive to a physical state in physical proximity to the user's device. Aspects of physical reality are typically represented on the screen; however even if they are not represented on the screen they typically still affect what's happening on the screen to some extent. This may be contrasted with virtual reality, in which a user's senses are typically fed a completely computer generated theme or environment, as an artificial sensorium.

Cross-Reality Drag and Drop

Figure 1:
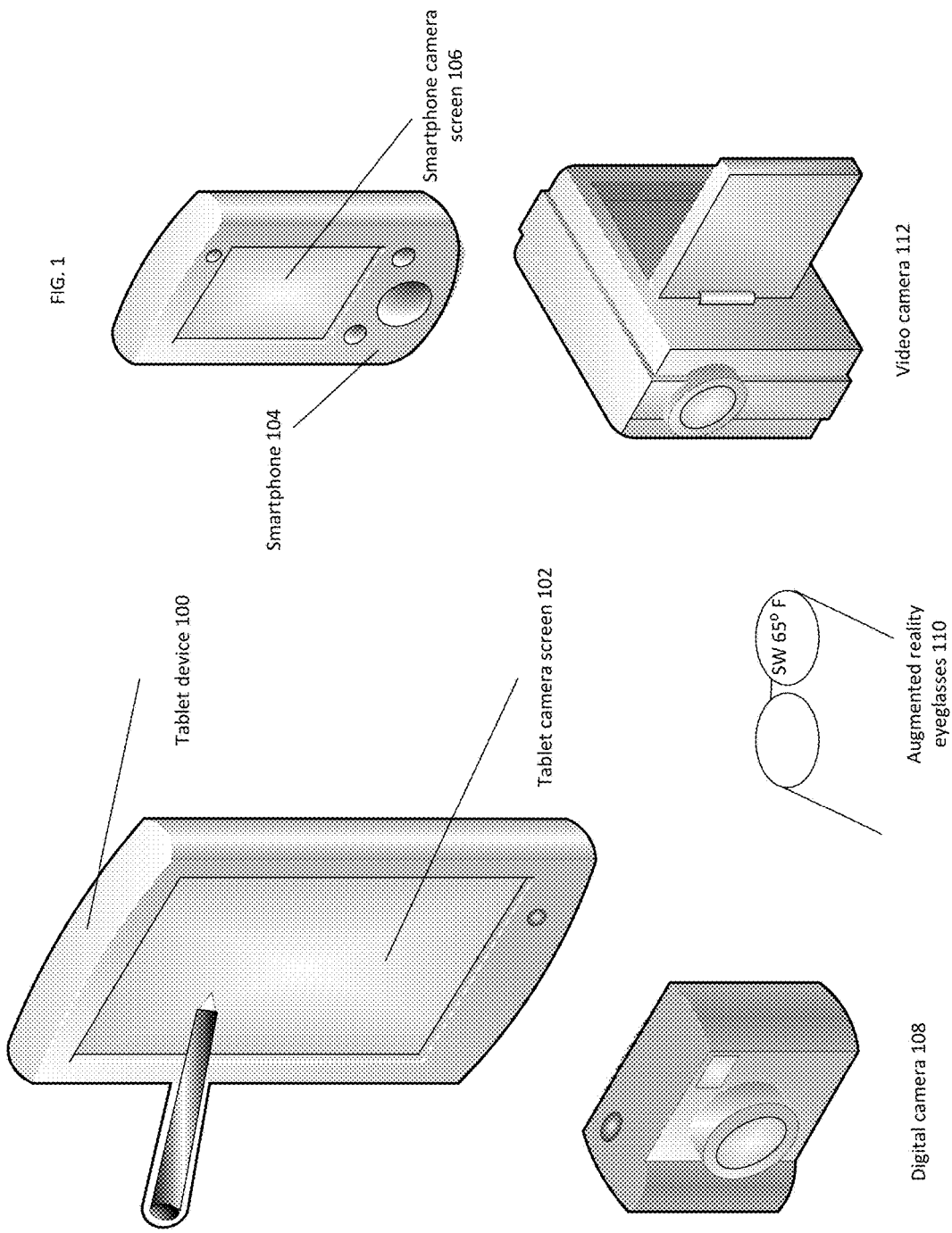
Figure 2:
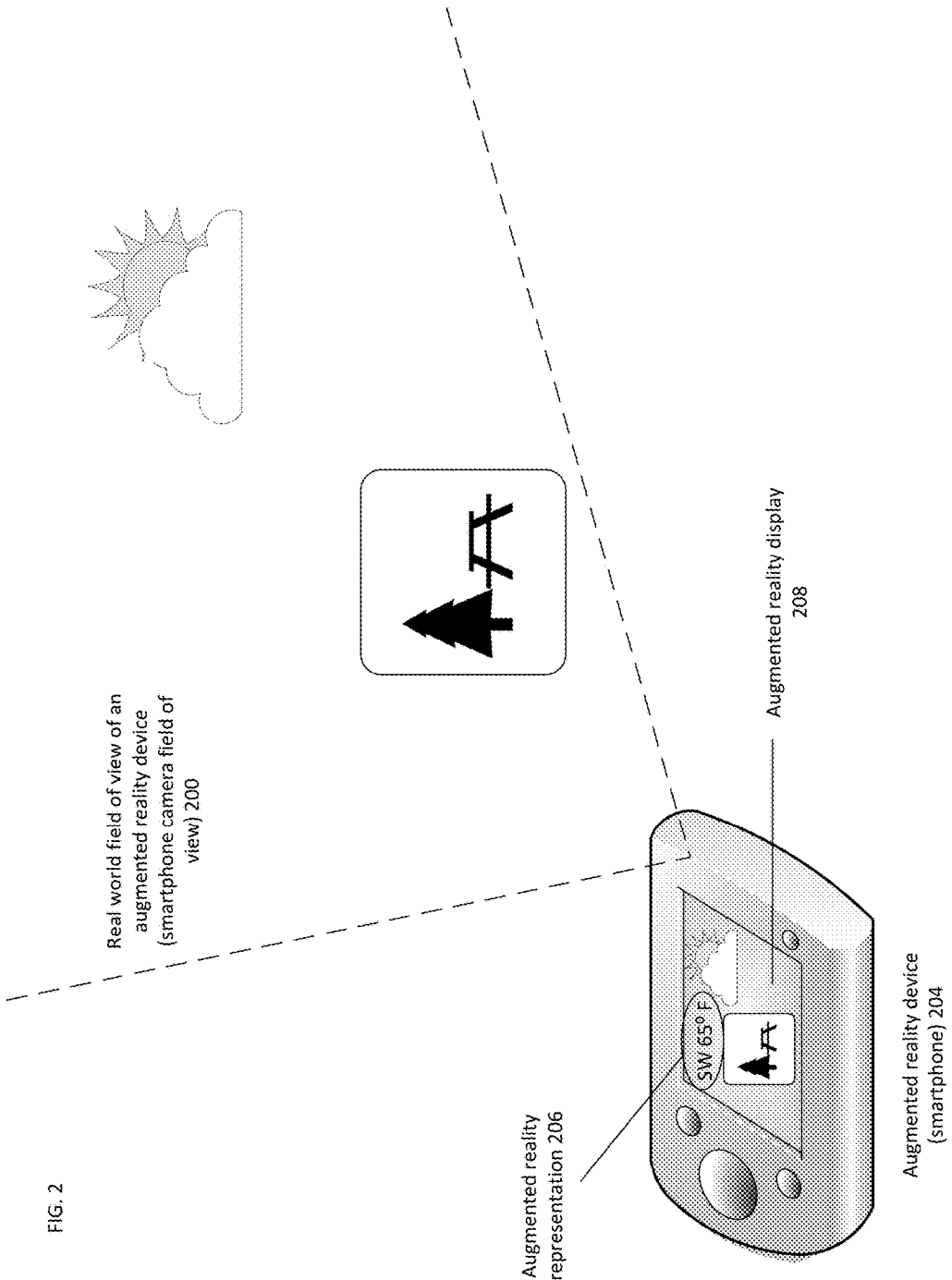
FIG. 2 illustrates an augmented reality device and a real world field of view of its camera.
Figure 3:
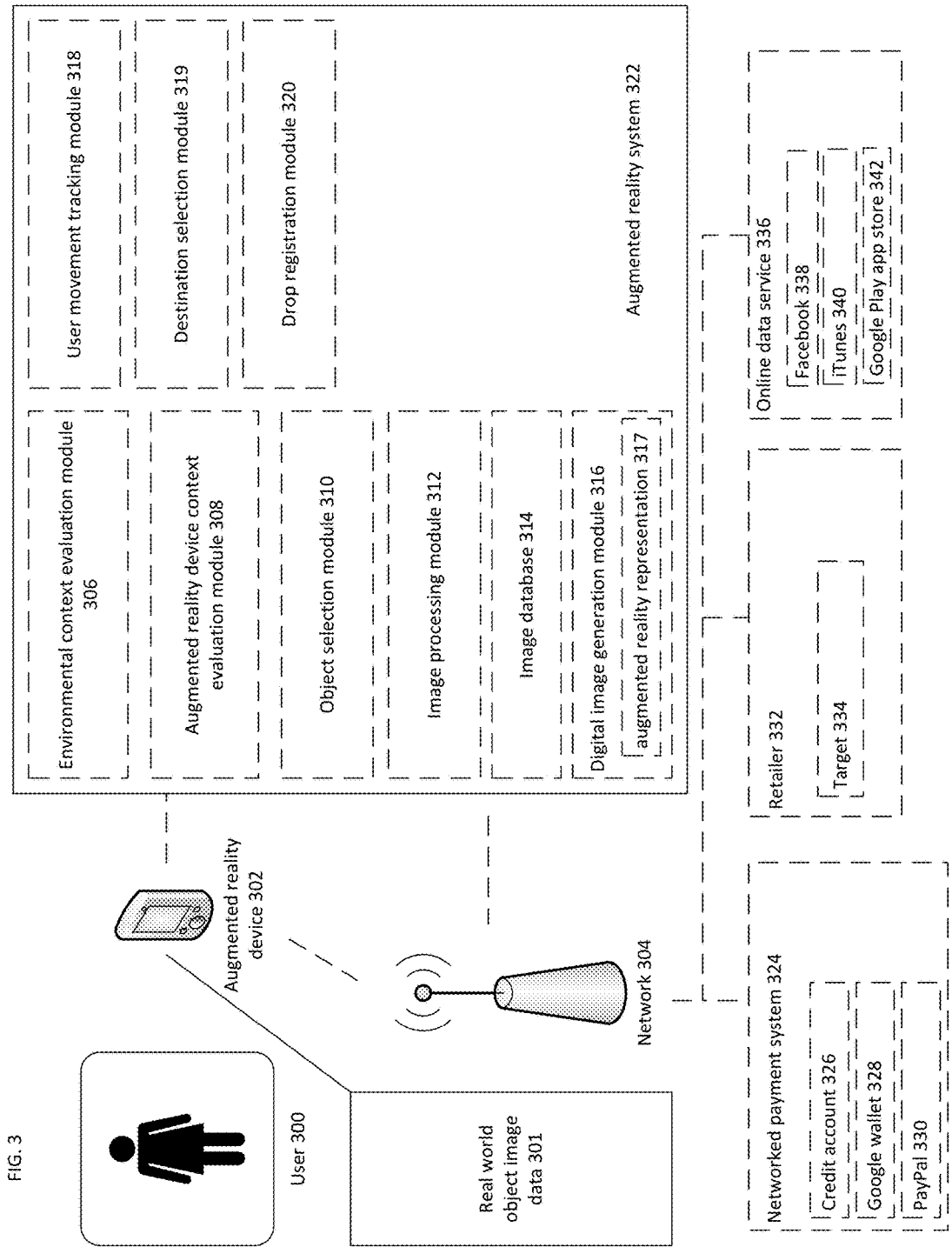
FIG. 3 illustrates one embodiment wherein a user interacts with a system to select, drag, and drop an augmented reality representation of a book.

As a courtesy to the reader, and with reference to the accompanying figures herein, in general "100 series" reference numerals will typically refer to items first introduced/described by FIG. 1, "200 series" reference numerals will typically refer to items first introduced/described by FIG. 2, "300 series" reference numerals will typically refer to items first introduced/described by FIG. 3, etc.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

By way of background, the traditional computer screen "desktop" area includes a drag-and-drop functionality that allows for powerful manipulation of graphical objects and environments. This typically involves 1) a source, 2) an object, and 3) a destination. These three things determine the semantics of operations in the drag-and-drop process.

In an augmented reality situation, as described herein, a user may perform a drag-and-drop operation from the real world into an augmented reality ("AR") view or display, and vice versa. For example, if a user is wearing AR glasses in a bookstore, there may be an AR shopping cart displayed on the glasses, viewable to the user. The user may then find a real book on a book shelf at the book store, point to the real book, peel off or otherwise pull an augmented reality representation of the book into the AR shopping cart. When the user arrives at a checkout stand or register to buy the book, the user may grab the AR book from the shopping cart, drag it onto the real cash register at which point payment may be initiated by the bookstore, and the transaction completed. The user may also select options for delivery of a physical book to herself or as a gift to someone else, and/or delivery of an electronic book to a device.

In another example, a user sitting at home in their living room may view her AR device on which is displayed an augmented reality representation of stacks of DVD's, which are functional links to Netflix videos, for example. The user may reach out and grab an augmented reality representation of a video, Star Wars, for example, and drag it onto the television in the living room, thereby signaling to Netflix to begin play of a streaming video of Star Wars on the (internet-ready) television, with concomitant notation in the user's Netflix account as to what was watched by the user when, and on which device. In some scenarios this may involve an associated debit to a credit account or bank account.

In another example, a user in the lobby of a movie theater may see a movie poster for the latest installment in the Star Wars saga, due out in theaters next year. The user may grab an an augmented reality representation of the movie poster to an augmented reality wishlist on her augmented reality display, thereby updating her Netflix queue, for example, to schedule notification when the movie is being shown at the theater, and/or when it is available on Netflix for viewing.

In each of these examples, a camera or other detector will recognize and mark the source of an action, in other words the start of the "drag." This is the object to be dragged. The camera or other detector will then monitor the "drag" or the motion away from the source object, and finally the camera or other detector will recognize or mark the destination, or "drop." This is the place of significance where the augmented reality representation is going. Each end of the action may be marked explicitly by the user, for example by voice, touch (of the object or of the AR device), gesture, or other signal.

Unlike traditional drag-and-drop on a computer desktop environment, not only is there a recognition step, but the user is pointing to something in a scene in which there are a limited number of targets available, which serves to constrain the recognition problem. In one embodiment, a constraint may be that a movie player app, like hulu or Netflix is running on the AR device or on another device like a television in proximity to the user. In another example, if an e-reader such as a kindle device is open during a book-shopping experience, that may be used as a constraint to tell the system to look for books in the environment during the recognition step.

Recognition of the intended object(s) will typically happen via image data from a camera viewing a scene through an AR device. Context that the user is in may be taken into account. For example, the AR device may recognize types of stores or collections of items such as books or DVD's; or even diverse collections of objects such as items at a grocery store.

Voice may be used to signal the correct recognition for "grabbing" an object prior to dragging it. Other ways of marking the start of the drag may also be used such as touching the object, tapping the object, touching a sensitive part of the AR device itself such as a button or touchscreen, and/or making a gesture that was pre-programmed in to the AR device to tell the system that a selection had been made for dragging.

In one embodiment, speech alone may be used to drag-and-drop an augmented reality representation.

In another embodiment, eye tracking may be used to identify, recognize, and select what the user is looking at, track the arc of movement, dragging, or transfer, and identify, recognize, and select the destination for the drop.

As used herein, "augmentation," "virtual," or "augmented reality representation" may refer to things that are added to a display of a real scene, such as computer generated images, text, or photographs.

In one embodiment, the system includes a hand-held augmented reality device, with at least one sensor (such as a camera), at least one graphical display for user output, and at least one touch screen (or other similar device) for user input. As directed by the user, the augmented reality device may activate and display an augmented reality scene that includes real interface objects (such as those imaged by the augmented reality device's camera) and at least one augmented reality representation of an object.

In one embodiment, a real interface object in an augmented reality display is detected and selected (e.g., by a first gesture, voice command, touch, or some other predetermined method) and then moved (e.g., the augmented reality device tracks movement using a second gesture, voice command, or some other predetermined method) within the augmented reality interface as an augmented reality (or virtual) representation of that object, either leaving the first real interface object unmodified, or removing the first real interface object from the scene. In response to selection and movement of the real interface object in the augmented reality interface, at least one destination for dropping the augmented reality representation of the object is presented in the augmented reality interface, perhaps in proximity to the real interface object. Destinations on the display for a drop may include a thumbnail photo, an icon, or some other symbol that in some cases will convey functionality upon the augmented reality representation of the object when dropped. A destination icon or symbol represents a target upon which the representation of the real interface object may be dropped (e.g., by a third gesture, voice command, or some other predetermined method).

For example, imagine a user is viewing an augmented reality scene in a retail store. She will see the real objects in the store (such as books, microwave ovens, and housewares) as well as virtual objects in the augmented reality display (such as product annotations and a shopping cart that follows her wherever she goes). If she wishes to purchase one of the books she sees on a shelf, within the augmented reality interface she may "pick up" a representation of all twelve volumes of the real Oxford English Dictionary with a hand gesture, drag, and then drop the augmented reality representation of them into her virtual shopping cart for check-out, at which point she may decide, for example, to purchase either a real or an electronic copy of the book, or both.

In another embodiment, a virtual interface object in an augmented reality display is selected (by a first gesture, voice command, touch, or some other predetermined method) and then moved (by a second gesture, voice command, or some other predetermined method) within the augmented reality interface. In response to selection and movement of the virtual interface object in the augmented reality interface, at least one real interface object may be presented in the augmented reality interface in proximity of the virtual interface object. Each real interface object in the augmented reality interface represents a target upon which the virtual interface object may be dropped (by a third gesture, voice command, or some other predetermined method).

For example, imagine you are viewing an augmented reality scene of your family rec room. You see all the real objects in the room (such as a television, a table, a couch, bookshelves, et cetera) overlaid with augmentations (such as the list of digital movies you own, perhaps represented by a stack of virtual DVDs on the table by the TV). You wish to watch one of the digital James Bond movies you own, so within the augmented reality interface you pick up the virtual Goldfinger DVD, drag, and drop it on the real television screen. The movie then begins to play on the real television (or it might be overlaid as an augmentation to the real television so only the user sees it, or both).

In another example, a user is given a photograph by a friend, and would like to post it on her social network page, such as her Facebook page. She may select the photograph with a hand gesture or voice, drag the resulting augmented reality representation of the photograph to a Fb icon in the corner of her augmented reality display, and drop it there to register her Facebook page as a destination for a digital copy of photograph to go. This works similarly for images to be added to Pinterest, notes to be added to a personal electronic diary, and other personal data repositories.

As a courtesy to the reader, and with reference to the accompanying figures herein, in general "100 series" reference numerals will typically refer to items first introduced/described by FIG. 1, "200 series" reference numerals will typically refer to items first introduced/described by FIG. 2, "300 series" reference numerals will typically refer to items first introduced/described by FIG. 3, etc.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 shows several devices that may be used for augmented reality interactions with a user. These include tablet device 100 having tablet camera screen 102, smartphone 104 having smartphone camera screen 106, digital camera 108, augmented reality eyeglasses 110 (showing an augmentation in the form of compass heading, e.g., "SW," and ambient temperature, e.g., "65° F."), and video camera 112. Other form factors may be fabricated having the functionality described herein.

FIG. 2 shows an augmented reality device (smartphone) 204 having an augmented reality display 208, which depicts an image of the real world field of view of the augmented reality device (smartphone camera field of view) 200, including the augmentated reality representation 206, e.g., "SW 65° F."

FIG. 3 illustrates an example augmented reality system 322 in which embodiments may be implemented. The system 322 may work through an augmented reality device 302 for use by user 300. Augmented reality system 322 may be implemented on augmented reality device 302, or it may be implemented remotely, in whole or in part, for example as a cloud service through network 304 to communicate with augmented reality device 302. The augmented reality system 322 may contain, for example, environmental context evaluation module 306, augmented reality device context evaluation module 308, object selection module 310, image processing module 312, image database 314, digital image generation module 316, user movement tracking module 318, destination selection module 319, and drop registration module 320. Augmented reality system 322 running on or through augmented reality device 302 may communicate over a network 304, wirelessly or by hardwired connection. By way of network 304, which may include a cloud computing component, augmented reality system 322 may communicate with network payment system 324, including credit account 326, google wallet 328, and/or PayPal 330. Augmented reality system 322 may also communicate via network 304 with a retailer 332, such as Target 334. Augmented reality system 322 may also communicate via network 304 with online data service 336 such as Facebook 338, iTunes 340, and/or Google Play app store 342.

In this way, a user may interact with digital representations of her environment in order to, inter alia, complete transactions, collect items of interest, e.g., digital media including digital images of real objects, or manipulate things such as movies and games for viewing or play, respectively.

As referenced herein, the augmented reality system 322 may be used to perform various data querying and/or recall techniques with respect to real world objects and/or augmented reality representations of real world objects. For example, where real world object image data is organized, keyed to, and/or otherwise accessible using one or more image databases, augmented reality system 322 may employ various Boolean, statistical, and/or semi-boolean searching techniques to select a correct real world object image among a set of images in a real world scene, e.g., by object selection module 310, and also to provide an augmented reality representation of the object, either by finding one in, e.g., image database 314, or by generating one, e.g., via digital image generation module 316.

Many examples of databases and database structures may be used in connection with augmented reality system 322. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive queries for disambiguating information and/or for gathering and/or compiling data from the relational database(s).

For example, SQL or SQL-like operations over one or more real world object image data may be performed, or Boolean operations using real world object image data 301 may be performed. For example, weighted Boolean operations may be performed in which different weights or priorities are assigned to one or more real world object images depending on context of the scene or context of the device 302, including other programs running on the device 302, perhaps relative to one another. For example, a number-weighted, exclusive-OR operation may be performed to request specific weightings of categories of objects depending on recognized cues such as geodata indicating location at a bookstore, e.g.

FIG. 4 illustrates an example of a user interaction with the instant augmented reality system. FIG. 4*a* depicts an augmented reality device (a smartphone showing on its display a bookshelf containing books in the camera's field of view.

FIG. 4b depicts a user's hand pointing to a book on one of the shelves; this gesture is detected by e.g., augmented reality system 322 and/or image processing module 312, which may capture text printed on the spine of the book in the vicinity of, or touched by, the user's index finger. Further, augmented reality device context evaluation module 308 may detect that the device is running a program having virtual shopping cart functionality associated with a specific bookstore (as indicated by the shopping cart image in the lower left corner of FIGS. 4b-4f), and, if there were other non-book items in the scene, the system may use the bookstore-related virtual shopping cart as a filter such that only books in the scene are considered for selection. In some embodiments, a menu, e.g., a drop-down menu of book titles for example may be presented for the user to select from.

Upon selection of a book, augmented reality system 322 and/or digital image generation module 316 may find in image database 314 and display, or create and display an augmented reality representation 417 of the selected book.

FIG. 4c depicts that a single book on the bookshelf is highlighted, corresponding to the one pointed to by the user's index finger.

FIG. 4d depicts a more detailed augmented reality representation 417 of the selected book in association with the user's hand as the hand moves toward the shopping cart icon on the display. This is the moving or dragging operation that will, upon the book's arrival at the shopping cart, tell the system that the information about the book should be recorded in the user's shopping cart account, perhaps on the bookstore's webpage. This is registration of the drop. For example, destination selection module 319 and/or drop registration module 320 may register the displayed augmented reality representation of the book at the shopping cart icon in the display of the augmented reality device in response to detecting that the user moved his pointing hand to the icon, as tracked by, e.g., user movement tracking module 318.

Optionally, the augmented reality display may provide an indication of registration of the drop, as shown in FIG. 4f, in which the shopping cart icon has been modified to include a 1 on it, indicating that there is one item in the cart.

The converse operations may also be carried out by augmented reality system 322, from AR to reality. This includes detecting an augmented reality representation 417 on a display, moving the displayed augmented reality representation 417 on the display of the augmented reality device according to at least one detected second action of the user (e.g., dragging it onto a real world item), and registering the displayed augmented reality representation at a location in a real world field of view of the augmented reality device in response to e.g., a dragging gesture ending at a credit card processing device for paying for a book, ending at a television for playing a movie, or ending at a car for transferring an audiobook to the car from a smartphone, for example.

And of course a reality-to-AR and back again process can be performed by the system, as shown in FIG. 14. One example of this is the complete process of detecting/selecting a real item indicated by a user, dragging an augmented reality representation 417 of it to a place on an AR device, then detecting/selecting it again for movement to a different real world object. One example of this is the complete process of choosing a book from a bookshelf at a bookstore, placing it in a virtual shopping cart, and then retrieving it for payment at a credit card processing device.

FIGS. 5-14 illustrate operational flows representing example operations related to selecting, dragging, and dropping in augmented reality systems. In the following figures that include various examples of operational flows, discussion and explanation may be provided with respect to the above-described system environments of FIGS. 1-4, and/or with respect to other examples and contexts. However, it should be understood that the operational flows may be executed in a number of other environments and contexts and/or in modified versions of FIGS. 1-4. Also, although the various operational flows are presented in the sequence(s) illustrated, it should be understood that the various operations may be performed in other orders than those which are illustrated, or may be performed concurrently.

Operational/Functional Language Herein Describes Machines/Machine Control/Machine-Controlled Processes Unless Context Dictates Otherwise The claims, description, and drawings of this application may describe one or more of the instant technologies in operational/functional language, for example as a set of operations to be performed by a computer. Such operational/functional description in most instances would be understood by one skilled in the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for massively complex computational machines or other means. As discussed in detail below, the operational/functional language must be read in its proper technological context, i.e., as concrete specifications for physical implementations. The logical operations/functions described herein are a distillation of machine specifications or other physical mechanisms specified by the operations/functions such that the otherwise inscrutable machine specifications may be comprehensible to the human reader. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail herein, these logical operations/functions are not representations of abstract ideas, but rather are representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very High speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc. For example, a high-level programming language is a programming language with strong abstraction, e.g., multiple levels of abstraction, from the details of the sequential organizations, states, inputs, outputs, etc., of the machines that a highlevel programming language actually specifies. See, e.g., Wikipedia, High-level programming language, http://en.wikipedia.org/wiki/Highlevel_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood by a human reader). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of logic, such as Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU) the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction). It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around 5 volts applied to a specific "wire." In addition to specifying voltages of the machines' configurations, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible to most humans. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high level programming language into machine language. This compiled machine language, as described above, is then used as the technical specification which sequentially constructs and causes the interoperation of many different computational machines such that useful, tangible, and concrete work is done. For example, as indicated above, such machine language—the compiled version of the higher level language—functions as a technical specification which selects out hardware logic gates, specifies voltage levels, voltage transition timings, etc., such that the useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality of logic(s), or (d) virtually any combination of the foregoing. Indeed, any physical object which has a stable, measurable, and changeable state may be used to construct a machine based on the above technical description. Charles Babbage, for example, constructed the first mechanized computational apparatus out of wood with the mechanism powered by cranking a handle.

Thus, far from being understood as an abstract idea, those skilled in the art will recognize a functional/operational technical description as a humanly understandable representation of one or more almost unimaginably complex and time sequenced hardware instantiations. The fact that functional/operational technical descriptions might lend themselves readily to high level computing languages (or high level block diagrams for that matter) that share some words, structures, phrases, etc. with natural language should not be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly level machine code, millions of logic gates, thousands of gate arrays, or any number of intermediate levels of abstractions. However, if any such low level technical descriptions were to replace the present technical description, a person of skill in the art could encounter undue difficulty in implementing the disclosure, because such a low level technical description would likely add complexity without a corresponding benefit (e.g., by describing the subject matter utilizing the conventions of one or more vendor specific pieces of hardware).

Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although a user may be shown/described herein as a single illustrated figure, those skilled in the art will appreciate that any user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Century Link, Southwestern Bell, etc.), or (g) a wired/wireless services entity (e.g., Sprint, Verizon, AT&T, etc.), etc.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT) (URL included merely to provide written description). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT) (URL included merely to provide written description).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT) (URL included merely to provide written description).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT) (URL included merely to provide written description).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT) (URL included merely to provide written description).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet are incorporated herein by reference, to the extent not inconsistent herewith.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   circuitry configured for determining at least one selection constraint based at least partly on one or more applications running on one or more devices in proximity to an augmented reality device;
   circuitry configured for recognizing one or more objects in a field of view that satisfy the at least one selection constraint;
   circuitry configured for constraining selection to the one or more objects in the field of view;
   circuitry configured for selecting at least one of the one or more objects in the field of view based at least partly on detection of a first action of a user at a location that corresponds to the at least one of the one or more objects; and
   circuitry configured for displaying an augmented reality representation on a display of the augmented reality device at least partly in response to selection of the at least one of the one or more objects.

2. The system of claim 1, further comprising:
circuitry configured for detecting a pointing gesture or a touch of a user at the location that corresponds to the at least one of the one or more objects.

3. The system of claim 1, further comprising:
circuitry configured for highlighting on the display of the augmented reality device the one or more objects for possible selection.

4. The system of claim 1, wherein the circuitry configured for determining at least one selection constraint based at least partly on one or more applications running on one or more devices in proximity to an augmented reality device comprises:
circuitry configured for determining at least one selection constraint based at least partly on one or more applications running on one or more devices in proximity to an augmented reality device and based at least partly on one or more of a time of day or a geographic location.

5. The system of claim 1, further comprising:
circuitry configured for detecting using image data the first action of the user at the location that corresponds to the at least one of the one or more objects.

6. The system of claim 1, further comprising:
circuitry configured for detecting a hand, finger, or pointing gesture of the user at the location that corresponds to the at least one of the one or more objects.

7. The system of claim 1, further comprising:
circuitry configured for detecting a voice command indicating selection of the at least one of the one or more objects.

8. The system of claim 1, further comprising:
circuitry configured for detecting the first action that matches at least one of a stored gesture or a stored image.

9. The system of claim 1, further comprising:
circuitry configured for dragging the augmented reality representation across the display of the augmented reality device according to a second action of the user.

10. The system of claim 1, further comprising:
circuitry configured for registering the augmented reality representation at a destination on the display of the augmented reality device at least partly in response to at least one of a user gesture, a user voice command, or a user touch command indicating that the destination has been reached.

11. The system of claim 1, further comprising:
circuitry configured for registering the augmented reality representation at an icon on the display of the augmented reality device at least partly in response to moving the augmented reality representation.

12. The system of claim 1, further comprising:
circuitry configured for performing image recognition with respect to the at least one of the one or more objects in the field of view.

13. The system of claim 1, further comprising:
circuitry configured for detecting a finger of the user within the field of view at a location that corresponds to the at least one of the one or more objects.

14. The system of claim 1, further comprising:
circuitry configured for obtaining from memory an enhanced depiction of the at least one of the one or more objects for display as the augmented reality representation.

15. The system of claim 1, further comprising:
circuitry configured for moving the augmented reality representation on the display of the augmented reality device to track movement of a finger of the user.

16. The system of claim 1, wherein the augmented reality device comprises a smartphone including a camera that defines the field of view.

17. The system of claim 1, wherein the circuitry configured for determining at least one selection constraint based at least partly on one or more applications running on one or more devices in proximity to an augmented reality device comprises:
circuitry configured for determining at least one selection constraint based at least partly on one or more media applications running on one or more display devices in proximity to an augmented reality device.

18. The system of claim 1, further comprising:
circuitry configured for initiating playback of content associated with the at least one of the one or more objects using at least one of the one or more devices in proximity to the augmented reality device.

19. The system of claim 1, wherein the augmented reality device comprises one or more of augmented reality eyeglasses, a smartphone, a tablet computer, a smartwatch, a digital camera, or a digital video device.

20. The system of claim 1, wherein the circuitry configured for displaying an augmented reality representation on a display of the augmented reality device at least partly in response to selection of the at least one of the one or more objects comprises:
circuitry configured for displaying an augmented reality representation including a list of one or more menu items on a display of the augmented reality device at least partly in response to selection of the at least one of the one or more objects.

21. The system of claim 1, wherein the circuitry configured for determining at least one selection constraint based at least partly on one or more applications running on one or more devices in proximity to an augmented reality device comprises:
circuitry configured for determining at least one selection constraint based at least partly on one or more applications running on one or more devices in proximity to an augmented reality device and based at least partly on a context proximate to the augmented reality device.

22. The system of claim 1, further comprising:
circuitry configured for detecting touch of a touch sensitive portion of the augmented reality device.

23. A computer processor configured to perform operations comprising:
determining at least one selection constraint based at least partly on one or more applications running on one or more devices in proximity to an augmented reality device;
recognizing one or more objects in a field of view that satisfy the at least one selection constraint;
constraining selection to the one or more objects in the field of view;
selecting at least one of the one or more objects in the field of view based at least partly on detection of a first action of a user at a location that corresponds to the at least one of the one or more objects; and
displaying an augmented reality representation on a display of the augmented reality device at least partly in response to selection of the at least one of the one or more objects.

24. An augmented reality device comprising:
a display; and
a computer processor programmed to perform operations including at least:
- determining at least one selection constraint based at least partly on one or more applications running on one or more devices in proximity to the augmented reality device;
- recognizing one or more objects in a field of view that satisfy the at least one selection constraint;
- constraining selection to the one or more objects in the field of view;
- selecting at least one of the one or more objects in the field of view based at least partly on detection of a first action of a user at a location that corresponds to the at least one of the one or more objects; and
- displaying an augmented reality representation on the display of the augmented reality device at least partly in response to selection of the at least one of the one or more objects.

25. A system comprising:
at least one computing device; and
one or more instructions that when executed on the at least one computing device program the at least one computing device to perform operations including at least:
- determining at least one selection constraint based at least partly on one or more applications running on one or more devices in proximity to an augmented reality device;
- recognizing one or more objects in a field of view that satisfy the at least one selection constraint;
- constraining selection to the one or more objects in the field of view;
- selecting at least one of the one or more objects in the field of view based at least partly on detection of a first action of a user at a location that corresponds to the at least one of the one or more objects; and
- displaying an augmented reality representation on a display of the augmented reality device at least partly in response to selection of the at least one of the one or more objects.

26. A system comprising:
means for determining at least one selection constraint based at least partly on one or more applications running on one or more devices in proximity to an augmented reality device;
means for recognizing one or more objects in a field of view that satisfy the at least one selection constraint;
means for constraining selection to the one or more objects in the field of view;
means for selecting at least one of the one or more objects in the field of view based at least partly on detection of a first action of a user at a location that corresponds to the at least one of the one or more objects; and
means for displaying an augmented reality representation on a display of the augmented reality device at least partly in response to selection of the at least one of the one or more objects.

* * * * *